(12) United States Patent
Zhu et al.

(10) Patent No.: US 11,128,142 B2
(45) Date of Patent: Sep. 21, 2021

(54) PHOTOVOLTAIC POWER GENERATION SYSTEM AND METHOD FOR CONTROLLING THE SAME

(71) Applicant: Delta Electronics (Shanghai) Co., Ltd., Shanghai (CN)

(72) Inventors: Xuancai Zhu, Shanghai (CN); Bingwen Weng, Shanghai (CN); Qin Wang, Shanghai (CN); Wei Zhao, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/666,402

(22) Filed: Oct. 29, 2019

(65) Prior Publication Data
US 2020/0343729 A1 Oct. 29, 2020

(30) Foreign Application Priority Data
Apr. 23, 2019 (CN) .......................... 201910329332.7

(51) Int. Cl.
*H02J 3/38* (2006.01)
*H02S 40/32* (2014.01)

(52) U.S. Cl.
CPC .............. *H02J 3/385* (2013.01); *H02S 40/32* (2014.12); *H02J 2300/26* (2020.01); *Y02E 10/56* (2013.01)

(58) Field of Classification Search
CPC ........ H02J 1/10; H02J 1/12; H02J 3/38; H02J 3/383; H02J 3/385; H02J 3/388;
(Continued)

(56) References Cited

U.S. PATENT DOCUMENTS

| 8,289,742 B2 * | 10/2012 | Adest | .................... G01S 3/7861 363/71 |
| 2008/0147335 A1 * | 6/2008 | Adest | ...................... H02J 3/385 702/64 |

(Continued)

FOREIGN PATENT DOCUMENTS

| CN | 102843022 A | 12/2012 |
| CN | 104993687 A | 10/2015 |

(Continued)

*Primary Examiner* — Levi Gannon
(74) *Attorney, Agent, or Firm* — CKC & Partners Co., LLC

(57) ABSTRACT

The invention discloses a photovoltaic power generation system and a method for controlling the same. The photovoltaic power generation system comprises: an string of optimizing modules and an inverter, the string of optimizing modules comprises a plurality of optimizing modules each having an input port coupled to at least one photovoltaic module, output ports of the plurality of optimizing modules are connected in series, each of the optimizing modules comprises a control unit, an input port of the inverter is coupled to an output port of the string of optimizing modules, and the inverter comprises an auxiliary detection module for auxiliary detecting an output current of the string of optimizing modules, and the control unit controls an output voltage of the string of optimizing modules based on the output current of the string of optimizing modules, such that the output voltage satisfies a start-up condition of the inverter.

10 Claims, 4 Drawing Sheets

(58) Field of Classification Search
CPC .. H02J 3/40; H02J 3/46; H02J 2300/22; H02J 2300/24; H02J 2300/26; H02M 1/36; H02M 7/42; H02M 7/44; H02M 7/54; H02S 40/30; H02S 40/32; H02S 40/36; H02S 50/00; H02S 50/10; Y02E 10/50; Y02E 10/56

See application file for complete search history.

(56) References Cited

U.S. PATENT DOCUMENTS

| | | | | |
|---|---|---|---|---|
| 2010/0109442 | A1* | 5/2010 | Vega Betoret | H02J 3/381 307/82 |
| 2011/0160930 | A1* | 6/2011 | Batten | H02J 3/387 700/298 |
| 2012/0176076 | A1* | 7/2012 | Mansfield | H02S 50/10 320/101 |
| 2013/0307556 | A1* | 11/2013 | Ledenev | G01R 31/50 324/509 |
| 2013/0320778 | A1* | 12/2013 | Hopf | H01L 31/02021 307/130 |
| 2014/0175888 | A1* | 6/2014 | Deboy | H02J 3/383 307/82 |
| 2014/0191589 | A1* | 7/2014 | Friebe | H01H 9/54 307/130 |
| 2014/0373894 | A1* | 12/2014 | Stratakos | H02H 1/0015 136/244 |
| 2015/0137606 | A1 | 5/2015 | Adest et al. | |
| 2015/0381108 | A1* | 12/2015 | Hoft | H02S 50/00 136/244 |
| 2016/0172860 | A1* | 6/2016 | Lipan | H02J 3/383 307/52 |
| 2020/0295572 | A1* | 9/2020 | Yao | H02J 3/381 |
| 2021/0033483 | A1 | 2/2021 | Ko | |

FOREIGN PATENT DOCUMENTS

| | | |
|---|---|---|
| CN | 105075046 A | 11/2015 |
| CN | 106253330 A | 12/2016 |
| CN | 106877311 A | 6/2017 |
| CN | 104079001 B | 8/2017 |
| WO | 2017141357 A1 | 8/2017 |

* cited by examiner

PHOTOVOLTAIC POWER GENERATION SYSTEM AND METHOD FOR CONTROLLING THE SAME

CROSS-REFERENCE TO RELATED APPLICATIONS

This non-provisional application claims priority under 35 U.S.C. § 119(a) on Patent Application No. 201910329332.7 filed in P.R. China on Apr. 23, 2019, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The invention relates to a photovoltaic power generation system and a method for controlling the same, and particularly relates to a photovoltaic power generation system with inverter and optimizing modules, and a method for controlling the same.

BACKGROUND ART

Currently, the photovoltaic power generation technology has been well developed, and has been widely applied on residential and commercial roof. The photovoltaic power generation system comprises a photovoltaic panel, a junction box, an inverter and other devices. The photovoltaic panel converts the received solar energy into DC electric power, and the inverter converts the DC electric power into desired AC electric power to be supplied to a power grid or to customers for use.

The photovoltaic power generation system having an optimizer enables the photovoltaic panel to have tracking of the maximum output power, and improve conversion efficiency. On the other hand, the photovoltaic panels connected in series and in parallel may have high voltage and high energy, and when an emergency (earthquake, fire, etc.) occurs, these photovoltaic panels with high voltage and high energy have to be immediately shut down to prevent any further damage caused by these panels with high voltage and high energy. The traditional photovoltaic system requires an extra rapid shut-down device coupled to the photovoltaic panels, while the photovoltaic system having an optimizer can achieve rapid shut-down of the panels using the optimizer. However, the optimizer needs to communicate with an inverter of subsequent power stage to achieve rapid shut-down, for example, by adding a modem circuit, such that the cost is increased and the communicated data is vulnerable to the interference of energy signals and the like, the communication also create reliability problem or economic loss due to poor communication or interference.

In addition, during the start-up of the photovoltaic system, sometimes, several optimizers cannot output voltage temporarily when shielded by the cloud or the shadows of building. With the conventional scheme, these optimizers are unable to start, resulting in a waste of power device and a loss of economic benefit.

A photovoltaic power generation system that overcomes the above deficiencies, and a method for controlling the same are hereby disclosed in this application.

DISCLOSURE OF THE PRESENT INVENTION

The invention provides a method for controlling a photovoltaic power generation system, the photovoltaic power generation system may comprise an string of optimizing modules and an inverter, the string of optimizing modules comprises a plurality of optimizing modules each having an input port coupled to at least one respective photovoltaic module, output ports of the plurality of optimizing modules are connected in series, each optimizing module comprises a control unit, an input port of the inverter is coupled to an output port of the string of optimizing modules, and the inverter comprises an auxiliary detection module.

The control method comprises:

step S1 for controlling, by the control unit, each of the optimizing modules to output an initial voltage;

step S2 for detecting and determining, by the inverter, an output voltage of the string of optimizing modules, and connecting the auxiliary detection module to the inverter when the output voltage of the string of optimizing modules is in a second voltage range;

step S3 for detecting and determining, by the control unit, an output current of the string of optimizing modules, and controlling the optimizing module to stably operate when the output current satisfies a stable operation condition, or otherwise increasing an output voltage of the corresponding optimizing module such that the output voltage of the string of optimizing modules satisfies a start-up condition of the inverter.

In the control method, the step S3 further comprises:

step S31 for detecting and determining, by the control unit, the output current of the string of optimizing modules, controlling each of the optimizing modules to stably operate, when the output current satisfies the stable operation condition, and then proceeding to step S32, or otherwise setting a voltage variation and then proceeding to step S32';

step S32 for detecting and determining the output voltage of the string of optimizing modules, wherein the inverter starts up to connect the photovoltaic power generation system to a power grid when the output voltage of the string of optimizing modules satisfies the start-up condition of the inverter;

step S32' for increasing the output voltage of each of the optimizing modules by the voltage variation, and then returning to step S31.

The control method further comprises:

step S4 for detecting and determining the output current of the string of optimizing modules, and controlling, by the control unit of the optimizing module, the corresponding optimizing module to output the initial voltage when the output current is less than a preset minimum current.

In the control method, the step S3 further comprises:

step S33 for controlling, by the control unit of the optimizing module, the corresponding optimizing module to operate in a Maximum Power Point Tracking (MPPT) mode.

In the control method, the auxiliary detection module is connected in parallel with the input port of the inverter.

In the control method, the auxiliary detection module comprises a plurality of power resistors connected in parallel.

In the control method, the step S2 further comprises detecting and determining the output voltage of the string of optimizing modules, and connecting at least one of the power resistors when the output voltage of the string of optimizing modules is in the second voltage range.

In the control method, the auxiliary detection module comprises a controllable current source.

In the control method, the step S2 further comprises detecting and determining the output voltage of the string of optimizing modules, and connecting the controllable current source to the inverter when the output voltage of the string of optimizing modules is in the second voltage range.

In the control method, the start-up condition of the inverter is that the inverter has an input voltage in a first voltage range.

In the control method, the stable operation condition of the optimizing module is that the output current of the optimizing module is larger than a preset current for a preset period of time.

The invention further provides a photovoltaic power generation system controlled by the above method, the photovoltaic power generation system comprising:

an string of optimizing modules and an inverter, the string of optimizing modules comprises a plurality of optimizing modules each having an input port coupled to at least one respective photovoltaic module, output ports of the plurality of optimizing modules are connected in series, each of the optimizing modules comprises a control unit, an input port of the inverter is coupled to an output port of the string of optimizing modules, and an auxiliary detection module changes an output current of the string of optimizing modules, and the control unit controls an output voltage of the string of optimizing modules based on the output current of the string of optimizing modules, such that the output voltage satisfies a start-up condition of the inverter.

In the photovoltaic power generation system, the control unit further controls the string of optimizing modules to rapidly shut-down based on the output current of the string of optimizing modules.

In the photovoltaic power generation system, the auxiliary detection module is externally connected to the inverter.

In the photovoltaic power generation system, the auxiliary detection module comprises a controllable current source.

In the photovoltaic power generation system, the auxiliary detection module comprises a power resistor.

In the photovoltaic power generation system, the start-up condition of the inverter is that the inverter has an input voltage in a first voltage range.

With respect to the prior art, the invention may have the following effects: by sampling the output voltage and the output current of the optimizing module, the optimizing module of the invention is capable of controlling the operating state of the photovoltaic power generation system without traditional communication with the inverter, appropriately controlling the output voltage of the optimizing module to ensure safely start-up of the inverter, and allowing the optimizing module to operate in a MPPT mode and to have Rapid Shut-Down(RSD) function.

DETAILED DESCRIPTION OF THE EXEMPLARY EMBODIMENTS

Hereinafter, the invention will be described in detail with reference to accompanying drawings and specific embodiments. The embodiments are carried out on the basis of the technical solution of the invention to illustrate detailed implementations and processes, but the protection scope of the invention is not limited to the embodiments.

Figure 1:
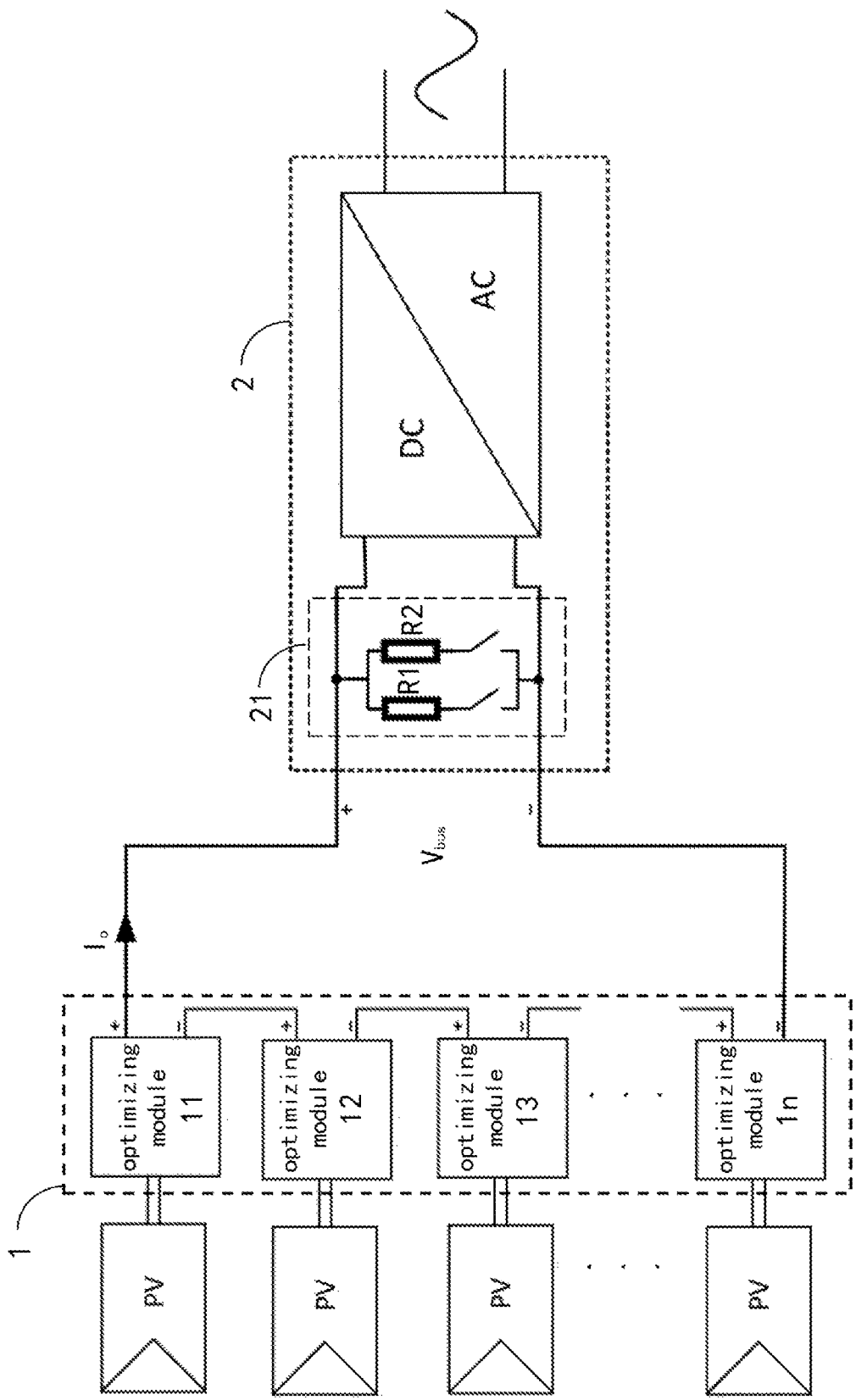
FIG. 1 is a diagram showing a structure of a photovoltaic power generation system according to a first embodiment of the invention.

FIG. 1 is a diagram showing a structure of a photovoltaic power generation system according to a first embodiment of the invention. As shown in FIG. 1, the photovoltaic power generation system of the invention comprises: a string of optimizing modules 1 and an inverter 2. The string of optimizing modules 1 comprises a plurality of optimizing modules 11, . . . , 1n, each having an input port coupled to at least one photovoltaic module respectively, such as PV panel, wherein n is a positive integer. The output ports of the plurality of optimizing modules 11, . . . , 1n are connected in series. Each of the optimizing modules 11, . . . , 1n comprises a control unit. An input port of the inverter 2 is coupled to an output port of the string of optimizing modules 1. An auxiliary detection module 21 is connected in parallel with the input port of the inverter 2 for changing an output current of the string of optimizing modules 1. The control unit controls an output voltage of the string of optimizing modules 1 based on the output current of the string of optimizing modules 1, such that the output voltage satisfies a start-up condition of the inverter 2. The start-up condition of the inverter 2 is that the inverter 2 has an input voltage Vbus in a first voltage range, i.e., $Vmin \leq Vbus \leq Vmax$, wherein Vmin is a minimum voltage that satisfies the start-up of the inverter 2, and Vmax is a maximum voltage that satisfies the start-up of the inverter 2.

Further, the control unit controls the rapid shut-down of the string of optimizing modules 1 based on the output current of the string of optimizing modules 1.

Further, the auxiliary detection module 21 is externally connected to the inverter 2.

Further, the auxiliary detection module 21 comprises a first power resistor R1 and a second power resistor R2.

Figure 2:
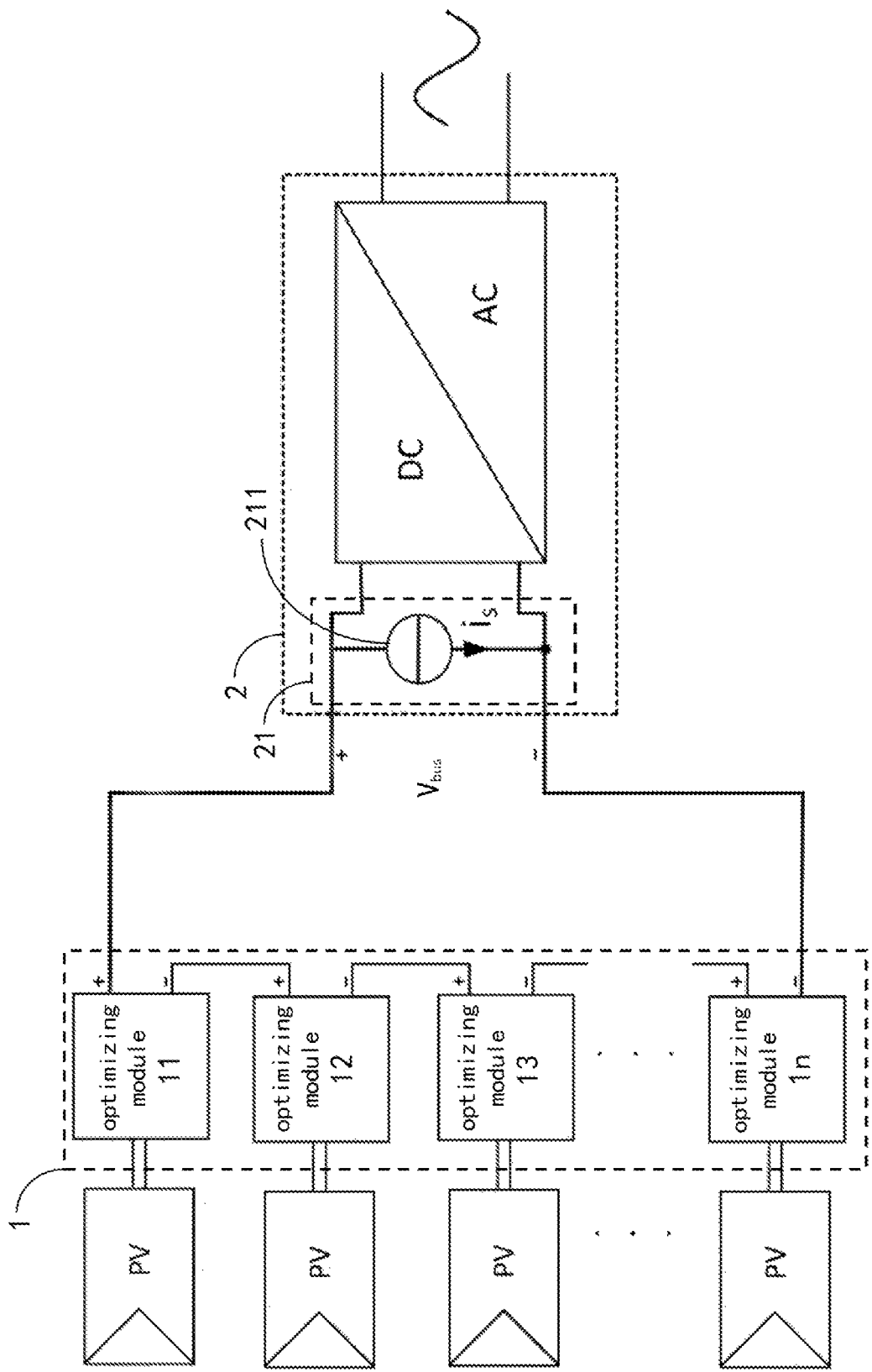
FIG. 2 is a diagram showing a structure of a photovoltaic power generation system according to a second embodiment of the invention.

FIG. 2 is a diagram showing a structure of a photovoltaic power generation system according to a second embodiment of the invention. The photovoltaic power generation system shown in FIG. 2 is substantially the same as the photovoltaic power generation system shown in FIG. 1, so the same parts will not be explained in detail. The difference in the second embodiment is that the auxiliary detection module 21 comprises a controllable current source 211.

Figure 3:
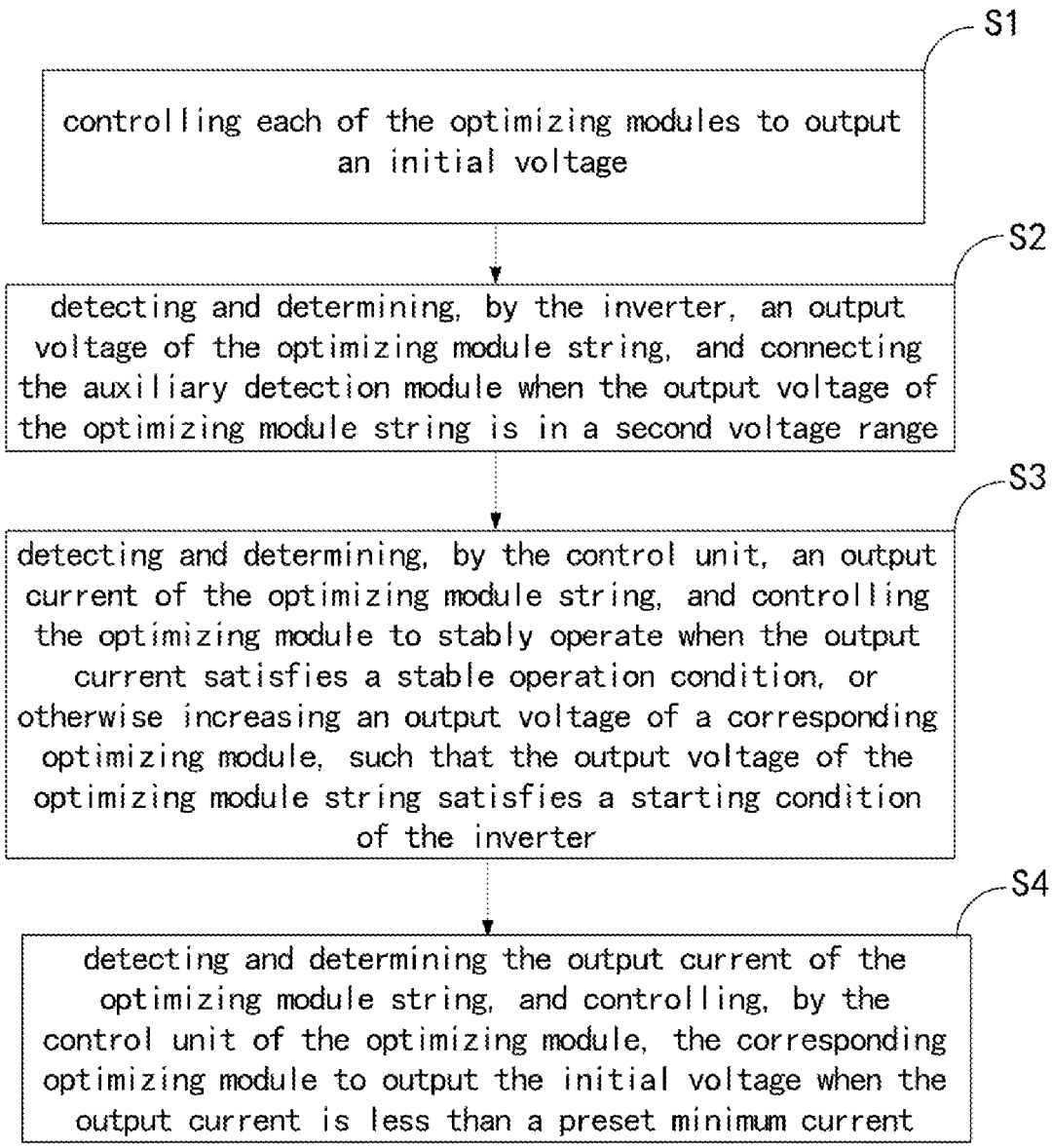
FIG. 3 is a flow diagram showing a control method according to the first embodiment of the invention.
Figure 4:
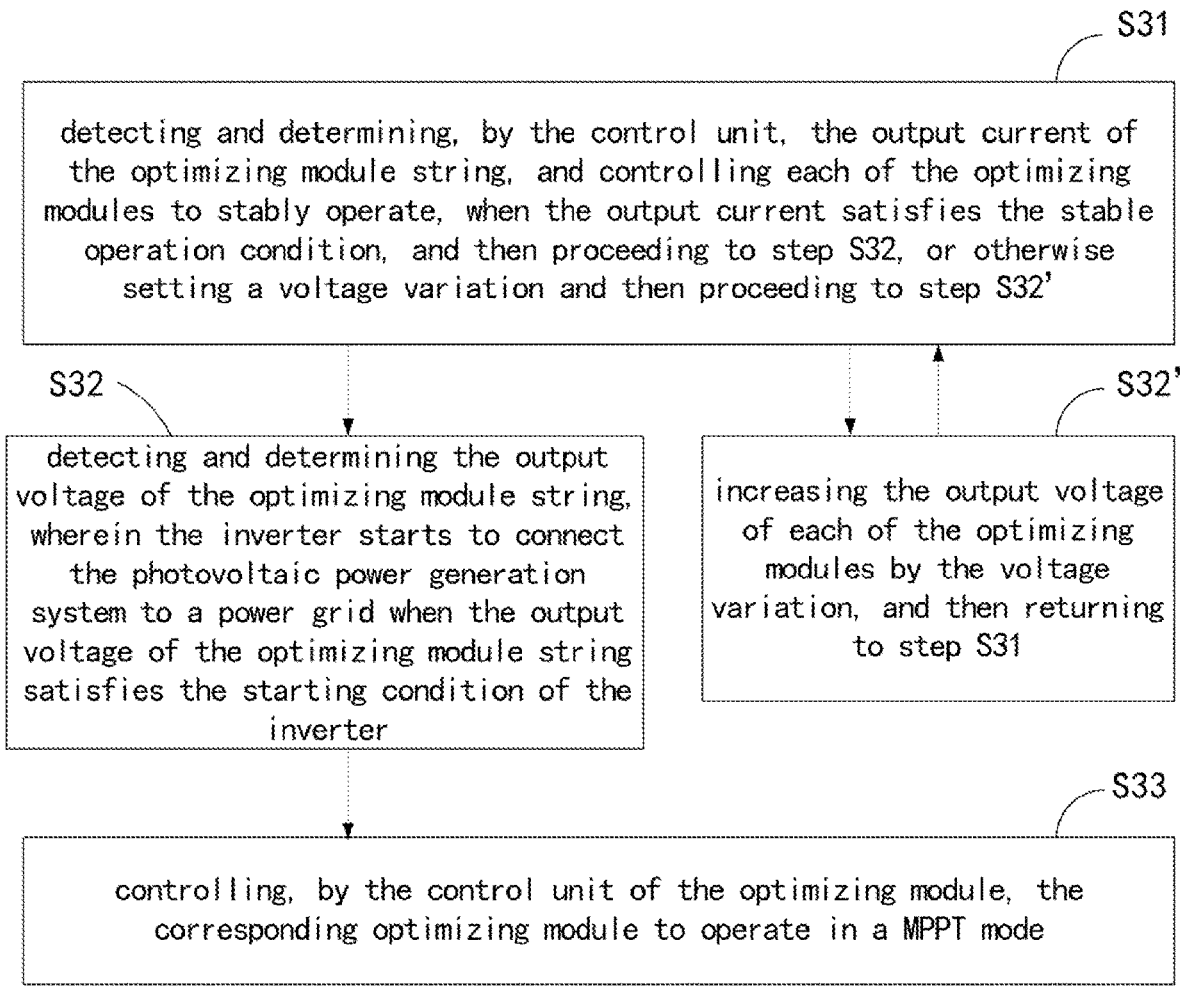
FIG. 4 is a flow diagram showing the details of controlling method in FIG. 3.

FIG. 3 is a flow diagram showing a control method according to the first embodiment of the invention, and FIG. 4 is a flow diagram showing the details of controlling method in FIG. 3. Hereinafter, the method for controlling the photovoltaic power generation system of the invention will be explained with reference to FIGS. 1 and 3-4. The control method comprises:

step S1 for controlling, by the control unit, each of the optimizing modules to output an initial voltage Vostart, wherein the initial voltage Vostart is set to have a small voltage value, such as $0V \leq Vostart \leq 2V$, to ensure that the output voltage of the optimizing modules connected in series can be controlled to have a relatively low voltage level during the rapid shut-down, such that when an emergency (earthquake, fire, etc.) occurs, further damage caused by the photovoltaic panels with high voltage and high energy can be prevented;

step S2 for detecting and determining, by the inverter, an output voltage Vbus of the string of optimizing modules, and connecting the auxiliary detection module when the output voltage Vbus of the string of optimizing modules is in a second voltage range, i.e., Vmin1≤Vbus≤Vmax1;

step S3 for detecting and determining, by the control unit, an output current Io of the string of optimizing modules, and controlling, by the control unit, the optimizing module to stably operate when the output current Io satisfies a stable operation condition, or otherwise increasing, by the control unit, an output voltage of a corresponding optimizing module, such that the output voltage of the string of optimizing modules satisfies a start-up condition of the inverter.

The start-up condition of the inverter is that the inverter has an input voltage in a first voltage range, i.e., Vmin≤Vbus≤Vmax, wherein Vmin is a minimum voltage that satisfies the start-up of the inverter, and Vmax is a maximum voltage that satisfies the start-up of the inverter.

Further, the step S3 further comprises:

step S31 for detecting and determining, by the control unit, the output current of the string of optimizing modules, and controlling each of the optimizing modules to stably operate, when the output current satisfies the stable operation condition, and then proceeding to step S32, or otherwise setting a voltage variation and then proceeding to step S32';

step S32 for detecting and determining the output voltage of the string of optimizing modules, wherein the inverter starts up to connect the photovoltaic power generation system to a power grid when the output voltage of the string of optimizing modules satisfies the start-up condition of the inverter;

step S32' for increasing the output voltage of each of the optimizing modules by the voltage variation, and then returning to step S31;

step S33 for controlling, by the control unit of the optimizing module, the corresponding optimizing module to operate in a MPPT mode.

It shall be noted that the stable operation condition of the optimizing module is that the output current of the optimizing module is larger than a preset current for a preset period of time.

Further, the control method comprises:

step S4 for detecting and determining, by the control unit, the output current Io of the string of optimizing modules, and controlling, by the control unit of the optimizing module, the corresponding optimizing module to output the initial voltage Vostart when the output current Io is less than a preset minimum current. For example, when the inverter disconnects from the grid, the output current Io of the string of optimizing modules rapidly decreases, and the control unit detects the output current Io of the string of optimizing modules. When the output current Io is less than the preset minimum current, the control unit controls the corresponding optimizing module to output the initial voltage Vostart for achieving the rapid shut-down, such that the output voltage of the optimizing modules connected in series can be controlled to have a relatively low voltage level during the rapid shut-down. Therefore, when an emergency (earthquake, fire, etc.) occurs, further damage caused by the photovoltaic panels with high voltage and high energy can be prevented, and personnel who take part in the emergency rescuing can be protected.

It shall be noted that, according to another embodiment shown in FIG. 2, when the auxiliary detection module 21 comprises a controllable current source 211, the step S2 further comprises detecting and determining, by the inverter, the output voltage of the string of optimizing modules, and connecting the controllable current source to the inverter when the output voltage of the string of optimizing modules is in the second voltage range.

In the photovoltaic power generation system and the method for controlling the same according to the invention, during the start-up process, when the optimizing module outputs a current within a certain range, the optimizing module may enter the start-up process until the inverter starts up successfully and operates stably. When the optimizing module outputs a current not satisfying the start-up condition, the optimizing module may not enter the start-up process. Instead, the optimizing module may directly enter the MPPT mode and stably operate after the output current is greater than a preset current for a preset period of time, which indicates that the inverter has started up successfully and a bus voltage is controlled by the inverter. Therefore, even when several optimizers in the photovoltaic system cannot start up temporarily due to the shielding of dark cloud or the shadow of building, these optimizers may enter the MPPT mode and stably operate after the inverters start up successfully.

In conclusion, by sampling the output voltage and the output current of the string of optimizing modules, the optimizing module of the invention is capable of controlling the operating state of the optimizing module without traditional communication with the inverter, appropriately controlling the output voltage of the optimizing module to ensure safely start-up of the inverter, and achieving MPPT function and RSD function.

It shall be noted that the above embodiments are merely provided to explain the invention, rather than limiting the technical solution claimed by the invention. Meanwhile, although the invention is explained in detail with reference to the above embodiments, the person having ordinary skills in the art shall understand that various modifications or equivalent replacements can be made to the invention. Therefore, all technical solution and improvement thereof without departing from the spirit and extent of the invention shall fall into the protection scope of the claims appended in the specification.

The invention claimed is:

1. A method for controlling a photovoltaic power generation system, the photovoltaic power generation system comprising a string of optimizing modules an inverter and an auxiliary detection module, the string of optimizing modules comprising a plurality of optimizing modules each having an input port coupled to at least one photovoltaic module respectively, output ports of the plurality of optimizing modules are connected in series, each optimizing modules comprising a control unit, the inverter having an input port coupled to an output port of the string of optimizing modules, and the auxiliary detection module connected in parallel with the input port of the inverter for controlling an output current of the string of optimizing modules, and comprising a plurality of power resistors connected in parallel with each other and a plurality of switches connected in series with respective power resistor;

the method comprising:
step S1 for controlling, by the control unit, each of the optimizing modules to output an initial voltage;
step S2 for detecting and determining, by the inverter, an output voltage of the string of optimizing modules, and controlling at least one switch to be turned on to connect at least one power resistor with the inverter when the output voltage of the string of optimizing modules is in a second voltage range; and step S3 for detecting and determining, by the control unit, the output current of the string of optimizing modules, and controlling the optimizing module to stably operate when the output current satisfies a stable operation condition, or otherwise increasing an output voltage of a corresponding optimizing module, such that the output voltage of the string of optimizing modules satisfies a start-up condition of the inverter.

2. The method of claim 1, wherein the step S3 further comprises:

step S31 for detecting and determining, by the control unit, the output current of the string of optimizing modules, and controlling each of the optimizing modules to stably operate, when the output current satisfies the stable operation condition, and then proceeding to step S32, or otherwise setting a voltage variation and then proceeding to step S32'; and step S32 for detecting and determining the output voltage of the string of optimizing modules, wherein the inverter starts up to connect the photovoltaic power generation system to a power grid when the output voltage of the string of optimizing modules satisfies the start-up condition of the inverter; or step S32' for increasing the output voltage of each of the optimizing modules by the voltage variation, and then returning to step S31.

3. The method of claim 2, wherein the step S3 further comprises:

step S33 for controlling, by the control unit of the optimizing module, the corresponding optimizing module to operate in a MPPT mode.

4. The method of claim 1, wherein the control method further comprises:

step S4 for detecting and determining the output current of the string of optimizing modules, and controlling, by the control unit of the optimizing module, the corresponding optimizing module to output the initial voltage when the output current is less than a preset minimum current.

5. The method of claim 1, wherein the start-up condition of the inverter is that the inverter has an input voltage in a first voltage range.

6. The method of claim 1, wherein the stable operation condition of the optimizing module is that the optimizing module has an output current larger than a preset current for a preset period of time.

7. A photovoltaic power generation system controlled by the method of claim 1, the photovoltaic power generation system comprising:

an string of optimizing modules comprising a plurality of optimizing modules each having an input port coupled to at least one photovoltaic module respectively, output ports of the plurality of optimizing modules connected in series, each of the optimizing modules comprising a control unit;

an inverter having an input port coupled to an output port of the string of optimizing modules; and an auxiliary detection module connected in parallel with the input port of the inverter for controlling an output current of the string of optimizing modules, and comprising a plurality of power resistors connected in parallel with each other and a plurality of switches connected in series with respective power resistor, wherein the control unit is configured to control an output voltage of the string of optimizing modules based on the output current of the string of optimizing modules, such that the output voltage satisfies a start-up condition of the inverter.

8. The photovoltaic power generation system of claim 7, wherein the control unit is further configured to control the string of optimizing modules to rapidly shut-down based on the output current of the string of optimizing modules.

9. The photovoltaic power generation system of claim 7, wherein the auxiliary detection module is externally connected to the inverter.

10. The photovoltaic power generation system of claim 7, wherein the start-up condition of the inverter is that the inverter has an input voltage in a first voltage range.

* * * * *